(12) United States Patent
Yoshikawa et al.

(10) Patent No.: US 7,525,883 B2
(45) Date of Patent: Apr. 28, 2009

(54) OPTICAL DISK APPARATUS

(75) Inventors: Akira Yoshikawa, Nara (JP); Kenji Kondo, Kadoma (JP)

(73) Assignee: Panasonic Corporation, Osaka (JP)

( * ) Notice: Subject to any disclaimer, the term of this patent is extended or adjusted under 35 U.S.C. 154(b) by 631 days.

(21) Appl. No.: 11/172,545

(22) Filed: Jun. 30, 2005

(65) Prior Publication Data

US 2006/0002251 A1    Jan. 5, 2006

(30) Foreign Application Priority Data

Jul. 5, 2004    (JP)    ............................. 2004-198455

(51) Int. Cl.
*G11B 7/08*    (2006.01)
(52) U.S. Cl. .................. 369/44.29; 369/44.35
(58) Field of Classification Search ........................ None
See application file for complete search history.

(56) References Cited

U.S. PATENT DOCUMENTS

| | | | |
|---|---|---|---|
| 6,785,204 B1 * | 8/2004 | Okuyama et al. | 369/44.32 |
| 2002/0150016 A1 | 10/2002 | Yasuda et al. | |
| 2003/0007431 A1 * | 1/2003 | Tateishi | 369/44.23 |
| 2003/0058753 A1 | 3/2003 | Lee et al. | |
| 2003/0058768 A1 * | 3/2003 | Yokoyama | 369/53.18 |

FOREIGN PATENT DOCUMENTS

| | | |
|---|---|---|
| JP | 1-303631 | 12/1989 |
| JP | 9-259449 | 10/1997 |
| JP | 2002-304753 | 10/2002 |
| JP | 2003-141754 | 5/2003 |

* cited by examiner

*Primary Examiner*—Jorge L Ortiz Criado
*Assistant Examiner*—Michael V. Battaglia
(74) *Attorney, Agent, or Firm*—Hamre, Schumann, Mueller & Larson, P.C.

(57) ABSTRACT

An optical disk apparatus is provided with an actuator that moves a beam spot that is formed by an optical head on an optical disk to recording surfaces; position control portions that control a position of the beam spot based on the output signal of the optical head; a disturbance estimation observer relating to the actuator; and a summing circuit that takes a sum of the output of the position control portion and the output of the observer, so as to drive the actuator based on the output of the summing circuit. The optical disk apparatus further is provided with a system controller that turns the observer on and off, a LPF that attenuates the high-frequency components of the output of the observer and retains the final value of the observer when the observer is turned off, and a switching circuit that switches between the output of the observer and the output of the LPF according to whether the observer is on or off. When the observer processing is off, the output of the LPF is supplied to the summing circuit. Thereby, instability in the control due to observer processing can be avoided even at the time of mode transition or addition of disturbance from outside.

3 Claims, 9 Drawing Sheets

(a)

(b)

OPTICAL DISK APPARATUS

BACKGROUND OF THE INVENTION

1. Field of the Invention

The present invention relates to improvements in actuator control in an optical disk apparatus, for controlling the position of the optical head for performing recording and reproduction of signals to and from optical disks.

2. Description of the Related Art

Optically recording and reproducing information to and from an optical disk using a light source such as a laser requires that focus control is performed in order to appropriately position the focal point (convergence point) of the light beam onto a recording surface of the optical disk and that tracking control is performed so that the light beam follows the tracks on that recording surface. In particular, when a recording density is high and so the spot diameter of the light beam should be small, the permissible defocus amount and detrack amount also become small, creating a need for more precise control.

In a conventional optical disk apparatus, an observer has been introduced as one way to improve control performance (see JP 2003-141754A (pg. 3, FIG. 7), for example).

FIG. 7 is a block diagram showing the configuration of the optical disk apparatus set forth in JP 2003-141754A. Reference numeral 21 denotes an optical disk to and from which information is recorded and reproduced by a light beam irradiated from an optical head 22. Here, FIG. 7 shows only the circuit for performing tracking control of the light beam, and the circuits involved in recording and reproducing information signals have been omitted from the drawing. The position of the objective lens (not shown) of the optical head 22 is controlled by driving via an actuator coil 23 such that the light beam is appropriately positioned on the recording surface of the optical disk 21. Light reflected from the optical disk 21 is converted into an electrical signal by a photodetector (not shown) of the optical head 22, reproducing the information signal. Along with this, a tracking error signal is generated by a tracking error signal generation circuit 24 based on the signal that has been converted to the electrical signal. The tracking error signal is supplied to a PID control circuit 25 and used for tracking control. The PID control circuit 25 has a configuration that is used for ordinary actuator control, and includes a low-frequency-region compensation circuit 25A, a proportional computation circuit 25B, and a phase compensation circuit 25C.

A disturbance estimation observer 26 receives the output of the tracking error signal generation circuit 24 and the output of the PID control circuit 25 as input and estimates the disturbance that is added to the actuator coil 23. A summing circuit 27 takes the sum of the output of the PID control circuit 25 and the output of the disturbance estimation observer 26 and supplies the result to a drive circuit 28. The drive circuit 28 drives the actuator coil 23 in correspondence with the output of the summing circuit 27.

The overall system of this optical disk apparatus is controlled by a system controller 29. A state determination circuit 30 determines the transient time of the tracking pull-in operation based on an operation command output by the system controller 29 and the tracking error signal output by the tracking error signal generation circuit 24. The disturbance estimation observer 26 is switched on or off depending on the output of the state determination circuit 30.

The disturbance estimation observer 26 for example has the configuration shown in FIG. 8. As one input of the disturbance estimation observer 26, an input voltage (Vi) of the PID control circuit 25 is input to the V→X conversion circuit 31. As its other input, a voltage (Vo) output by the PID control circuit 25 is input to a V→F conversion circuit 32. The V→X conversion circuit 31 converts the input voltage (Vi) of the PID control circuit 25 into a displacement amount (X) of the actuator 23. The V→F conversion circuit 32 converts the output voltage (Vo) of the PID control circuit 25 into a drive force (F) of the actuator 23. The displacement amount (X) and the drive force (F) are input to an estimating circuit 33, and from this the estimated disturbance is output and supplied to a F→V conversion circuit 34. The F→V conversion circuit 34 performs the opposite conversion to the V→F conversion circuit 32, converting the drive force (F) of the actuator into the voltage value output by the PID control circuit 25.

"Mn" in the estimating circuit 33 denotes the nominal value of the lens mass supported by the actuator 23, and "s" denotes a Laplacian operator. "g1" and "g2" are coefficients determining the properties of the disturbance estimation observer 26. Further, (1/Mn·1/s·1/s) represents the model of a secondary resonance-type actuator.

With this optical disk apparatus, the PID control circuit 25 and the disturbance estimation observer 26 both are in operation during tracking control. Further, the disturbance estimation observer 26 uses the input and the output of the PID control circuit 25 to estimate the disturbance that is added to the actuator 23, thereby allowing the drive signal from the PID control circuit 25 to be corrected accurately and allowing disturbance to be inhibited efficiently.

The tracking pull-in operation of the conventional optical disk apparatus configured as above is described with reference to the waveform diagram of FIG. 9. (a) shows the system control command ("command" hereinafter) output from the system controller 29. TrOFF is the tracking "off" command, and TrON is the tracking "on" command. A waveform (b) shows the output of the result determined by the state determination circuit 30. A waveform (c) is the tracking error signal, (d) is the integral value of the PID control circuit 25, (e) is the integral value of the disturbance estimation observer 26, and (f) is the drive signal output from the drive circuit 28. As indicated by the output of the state determination in (b), the waveforms prior to the temporal point t1 indicate the tracking "off" state, during the period of t1 to t2 indicate the transient state of the tracking pull-in operation, and after t2 indicate a steady control state in which the tracking operation has stabilized.

In the tracking "off" state, when the tracking "on" command (a) is output from the system controller 29, then the PID control circuit 25 generates a control signal from the tracking error signal (c) that is input at that time and performs control of the tracking pull-in operation. As a result, the actuator coil 23 is driven by the drive signal (f) from the drive circuit 28 and the amplitude of the tracking error signal (c), which until that point had been output as a sinusoidal wave pattern, becomes smaller with the progress of the pull-in operation. At this time the state determination circuit 30 determines that the pull-in operation is occurring based on the command (a) and the action of the tracking error signal (c), and keeps the disturbance estimation observer 26 in the "off" state as shown in (e).

When the tracking error signal (c) has stabilized at a center value and it has been detected that the off-track amount has settled to within a predetermined range, the state determination circuit 30 makes the determination that the tracking operation has become steady, and activates the disturbance estimation observer 26. The disturbance estimation observer 26 accordingly then performs disturbance estimation using the tracking error signal (c) near the zero-cross point from the start of processing.

When the tracking pull-in operation first starts, the tracking error signal (c) fluctuates considerably and thus it cannot be said to represent the movement of the actuator 23 accurately. Using the tracking error signal (c) at this point therefore would lower the accuracy of the disturbance estimation. On the other hand, the tracking error signal (c) near the zero-cross point after the tracking operation has stabilized faithfully represents the movement of the actuator 23, and thus allows more accurate disturbance estimation to be performed. Consequently, setting the disturbance estimation observer 26 to "off" as mentioned above eliminates the factor of the disturbance estimation observer 26 being unstable during the pull-in operation, and by adding a control that employs disturbance estimation in the steady control state, the stability of the operation is increased.

As illustrated above, the state determination circuit 30 determines the control state from the command and the tracking error signal, and by detecting that there has been a transition from the pull-in state to the steady state and activating the disturbance estimation observer 26, the disturbance estimation observer 26 can perform disturbance estimation using accurate information from the moment that it is activated. This makes it possible to prevent the control from becoming unstable due to a large error in the disturbance estimation.

However, although the above optical disk apparatus can improve the stability of the pull-in operation, control becomes unstable when there is considerable fluctuation in the gain crossover frequency, such as at the time of mode transition, during which the focal point position is moved between a plurality of recording surfaces. Further, the estimation of the disturbance, etc., becomes inaccurate and causes the error control to become unstable if in the steady state there is considerable fluctuation in the error signal due to external vibration that causes the relation between the error signal and the position of the actuator coil to be lost.

In other words, the observer processing that is introduced in order to ensure that control is stable in the steady state has the opposite effect of causing the control to become unstable at the time of mode transition or if a disturbance or vibration is added.

SUMMARY OF THE INVENTION

It is an object of the present invention to provide an optical disk apparatus that avoids instability in the control due to observer processing at the time of mode transition or in a case where disturbance has been added.

An optical disk apparatus of the present invention is provided with an optical head that focuses a light beam to form a beam spot on a recording surface of an optical disk and detects light that is reflected therefrom, a movement portion that moves the beam spot in a direction that is perpendicular to the recording surface or in a radial direction of the optical disk, a position control portion that controls a position of the movement portion based on an output signal of the optical head such that the beam spot is in a predetermined state with respect to the recording surface, an observer processing portion that estimates a state relating to the movement portion, and a summing portion that takes a sum of an output of the position control portion and an output of the observer processing portion. The optical disk apparatus drives the movement portion based on an output of the summing portion.

To solve the foregoing issues, the optical disk apparatus of the invention is further provided with an ON/OFF control portion that controls whether the observer processing portion is on or off, a low-pass filter that attenuates high-frequency components of the output of the observer processing portion and holds a final value of the observer processing portion when the observer processing portion is turned off, and a switching portion that switches its output between the output of the observer processing portion and an output of the low-pass filter according to whether the observer processing portion is on or off. When the observer processing portion is in the on state, its output is supplied to the summing portion, and when the observer processing portion is in the off state, the output of the low-pass filter is supplied to the summing portion.

With this configuration, a value that is close to the DC level of the estimation of the disturbance, for example, is output without the instantaneous value of the estimation of the disturbance, for example, being held when the observer processing portion is turned off while operating. Thus the stability of the operation can be ensured without significant vibration of the movement portion.

DESCRIPTION OF THE PREFERRED EMBODIMENTS

In the optical disk apparatus of the invention, it is preferable that the cutoff frequency of the low-pass filter is set below the control band of the observer processing portion.

It is also possible for the optical disk apparatus of the invention to adopt a configuration in which it further comprises a state management portion that manages a transition to a state in which a loop gain of the position control by the position control portion fluctuates, where the ON/OFF control portion controls whether the observer processing portion is on or off based on an output of the state management portion, and where the state management portion sets the observer processing portion to off prior to transition to the state in which the loop gain of the position control fluctuates, and sets the observer processing portion to on after transition to a state in which the loop gain is stable.

With this configuration, by turning off observer processing before there is fluctuation in the loop gain of the position control, it is possible to secure a sufficient phase margin during loop gain fluctuation and keep the control stable.

It is also possible for the optical disk apparatus of the invention to adopt a configuration in which it further comprises a state determination portion that detects a control state of the position of the movement portion at that time based on at least the output of the optical head, where the ON/OFF control portion controls whether the observer processing portion is on or off in accordance with an output of the state determination portion, and where the state determination portion supplies an output for setting the observer processing portion to off to the ON/OFF control portion if the output of the optical head has deviated from a predetermined range.

With this configuration, the observer processing portion is turned off if there is a drop in the amount of reflection light due to out of a focus control and it is determined that the observer processing portion is not operating normally. This conversely allows the control to be kept from becoming unstable due to the disturbance, etc., estimated by the observer processing portion.

It is also possible for the optical disk apparatus of the invention to adopt a configuration in which the position control portion is provided with a position error detection portion that detects an amount of deviation of the optical head from an ideal position, and a PID filter processing portion that subjects an output of the position error detection portion to at least phase compensation, and in which the observer processing portion is configured such that it estimates a disturbance, for example, from the input and the output of the PID filter processing portion.

Optical disk apparatuses according to embodiments of the present invention are described in specific detail below with reference to the drawings.

First Embodiment

Figure 1:
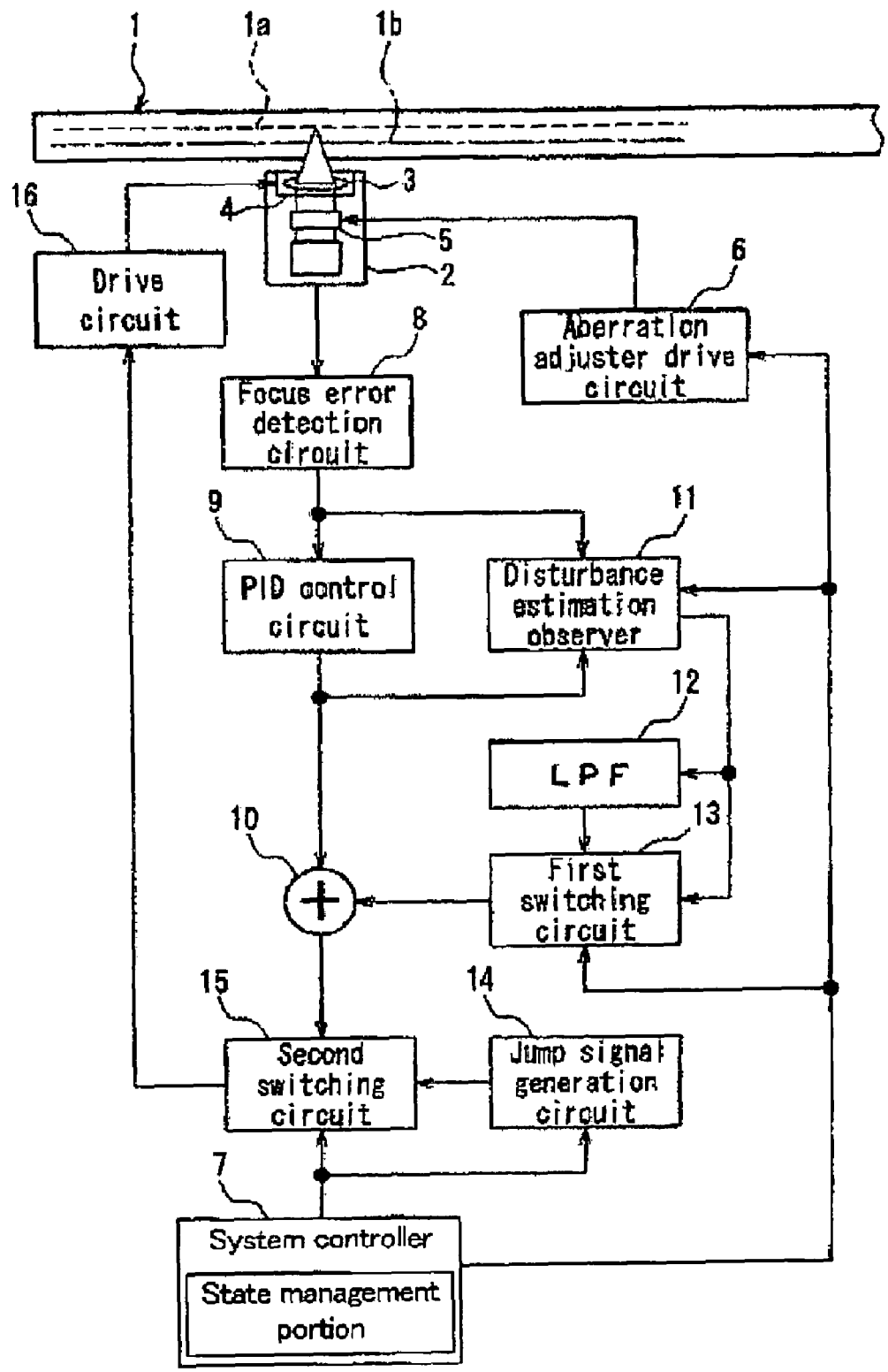
FIG. 1 is a block diagram showing a schematic configuration of the main elements of the optical disk apparatus according to the first embodiment of the invention.

FIG. 1 is a block diagram showing the configuration of an optical disk apparatus according to the first embodiment of the invention. An optical disk 1 is a two-layer disk having a first recording surface 1*a* and a second recording surface 1*b*. Information is recorded and reproduced to and from the optical disk 1 by a light beam that is irradiated from an optical head 2. Here, FIG. 1 shows only the circuit involved in focus control, and the circuits directly involved in recording and reproducing information signals, for example, have been omitted from the drawing.

Figure 7:
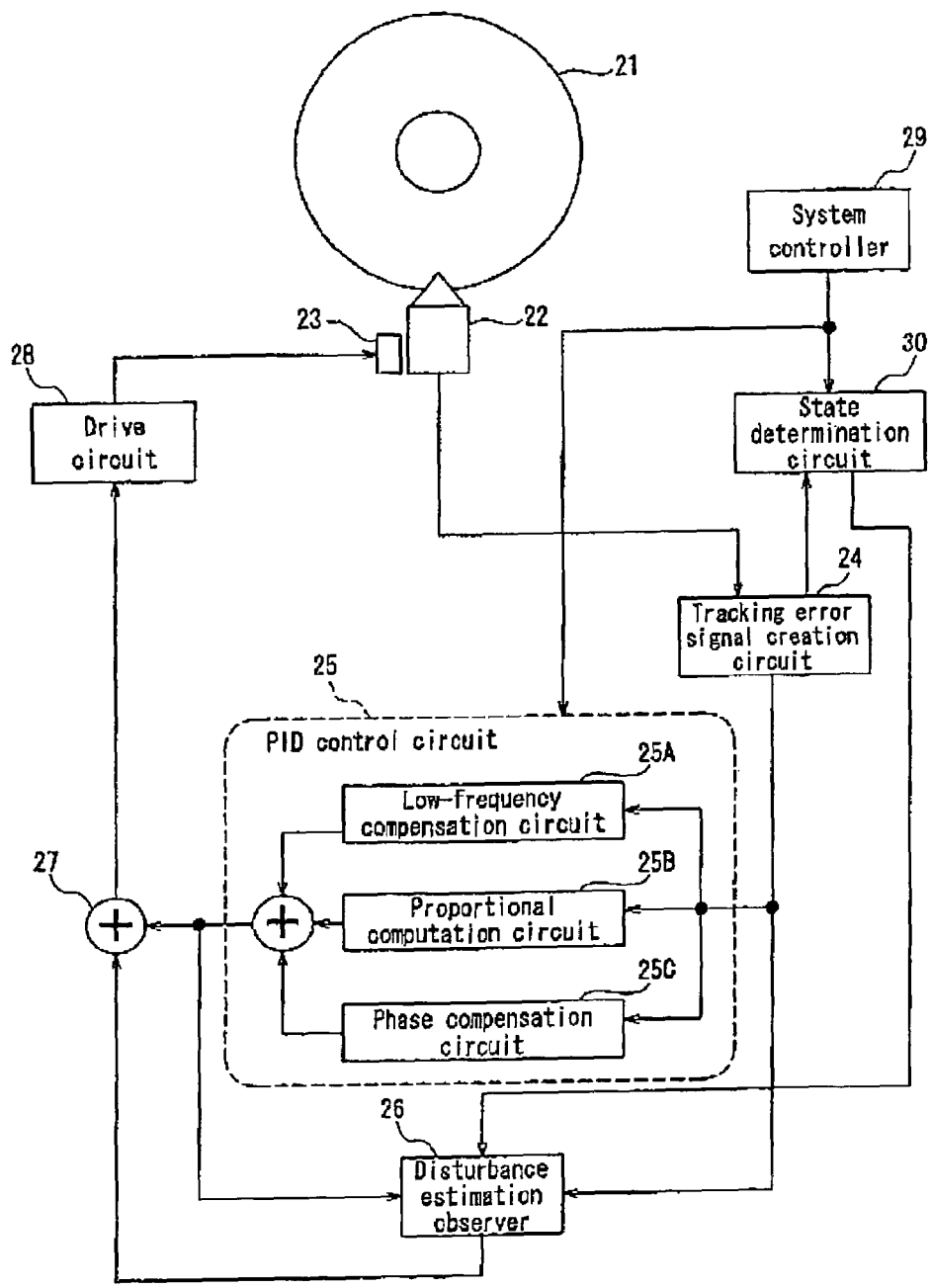
FIG. 7 is a block diagram showing the schematic configuration of the main elements of an optical disk apparatus according to a conventional example.

An objective lens 3 provided in the optical head 2 is driven by an actuator 4 and forms a beam spot on the optical disk 1. An aberration adjuster 5 is provided in the optical head 2 and is driven by an aberration adjuster drive circuit 6 to adjust the optical system such that spherical aberration does not occur on the recording surface from which information is to be read. The aberration adjuster drive circuit 6 is operated by a command from a system controller 7. A focus error detection circuit 8 outputs a focus error signal that indicates an amount of deviation between the focal position of the objective lens 3 and either the first recording surface 1*a* or the second recording surface 1*b* of the optical disk 1. The focus error signal is supplied to a PID control circuit 9 and subjected to PID filtering, and the result output by the PID control circuit 9 is supplied to a summing circuit 10. The PID control circuit 9, like that shown in FIG. 7, has a configuration that is used for ordinary actuator control, and although not shown, includes a low-frequency compensation circuit, a proportional computation circuit, and a phase compensation circuit.

Figure 8:
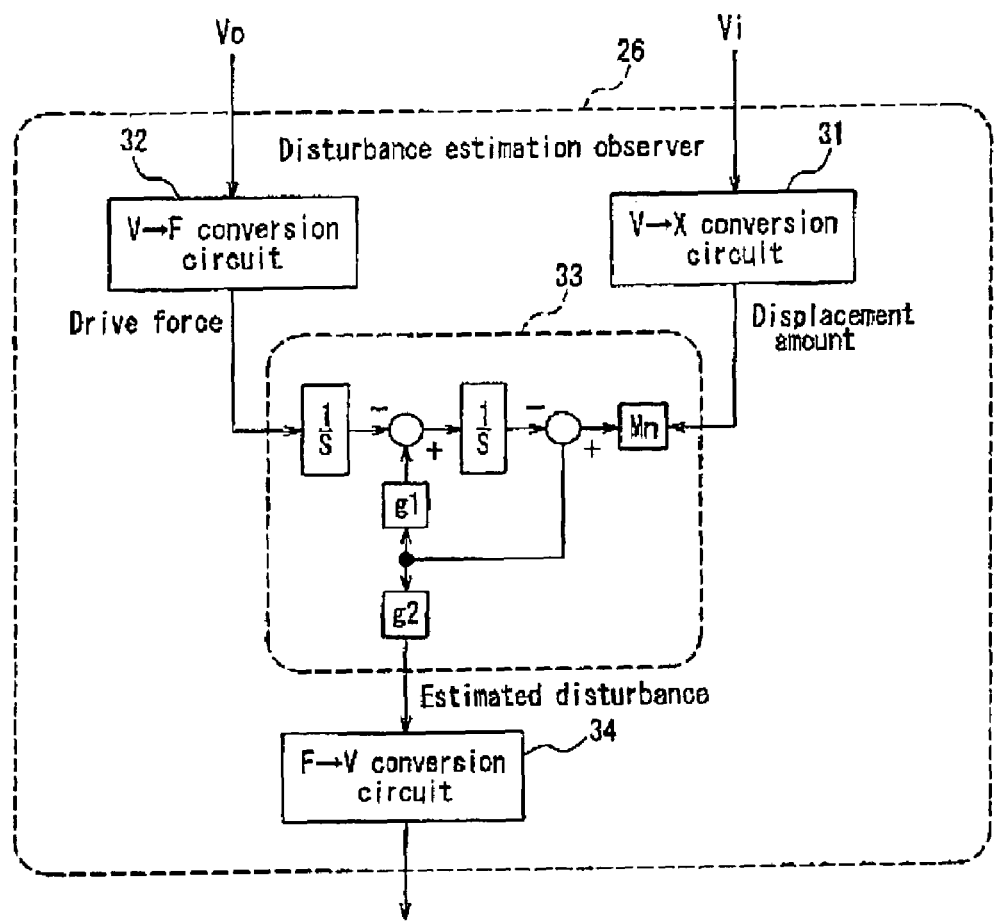
FIG. 8 is a block diagram showing an example of the configuration of the disturbance estimation observer in the optical disk apparatus of FIG. 7.
Figure 9:
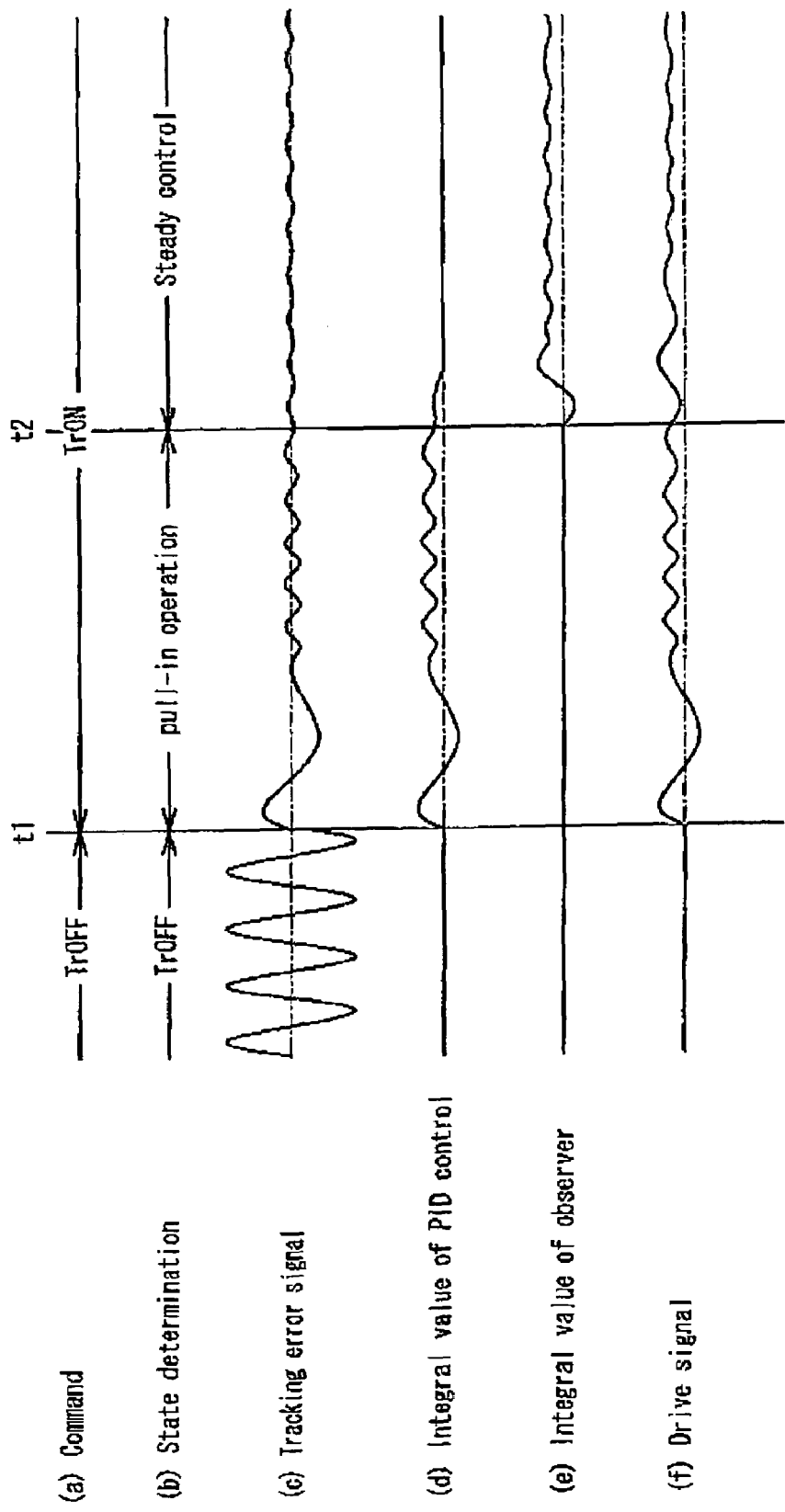
FIG. 9 is a waveform diagram describing the operation of the optical disk apparatus of FIG. 7.

A disturbance estimation observer 11 receives the output of the focus error detection circuit 8 and the output of the PID control circuit 9 as input and estimates the disturbance that is added to the actuator 4. The specific configuration of the disturbance estimation observer 11 is omitted from the drawing, but for example it may have the same configuration as the conventional disturbance estimation observer 26 shown in FIG. 8. A LPF (low-pass filter) 12 outputs a signal obtained by reducing the high-frequency components of the estimated disturbance that is output by the disturbance estimation observer 11, and its cutoff frequency is set to a frequency that is several times that of the rotational frequency of the disk 1, such as 100 Hz. A first switching circuit 13 switches between the estimated disturbance and the output of the LPF 12 according to a command from the system controller 7, and outputs this to the summing circuit 10.

A jump signal generation circuit 14 outputs a jump signal for moving the focal position of the objective lens 3 to the other recording surface in accordance with a command from the system controller 7. A second switching circuit 15 switches between the jump signal that is output by the jump signal generation circuit 14 and the output of the summing circuit 10 in accordance with a command from the system controller 7, and delivers this to a drive circuit 16. The actuator 4 is driven by the output signal of the drive circuit 16, keeping the beam spot on the optical disk 1 in a predetermined state. When the command to move the focal position of the objective lens 3 to the other recording surface has been output from the system controller 7, the disturbance estimation observer 11 is turned off, and under the control after this jump is finished, the disturbance estimation observer 11 is turned on. That is, the disturbance estimation observer 11 is turned on and off by the system controller 7. It should be noted that, as will be discussed later, the loop gain of the focal position control is altered by moving the focal position of the objective lens 3 to the other recording surface. That is, the system controller 7 also has a state management function relating to the transition to a state in which the loop gain of the position control fluctuates.

Figure 2:
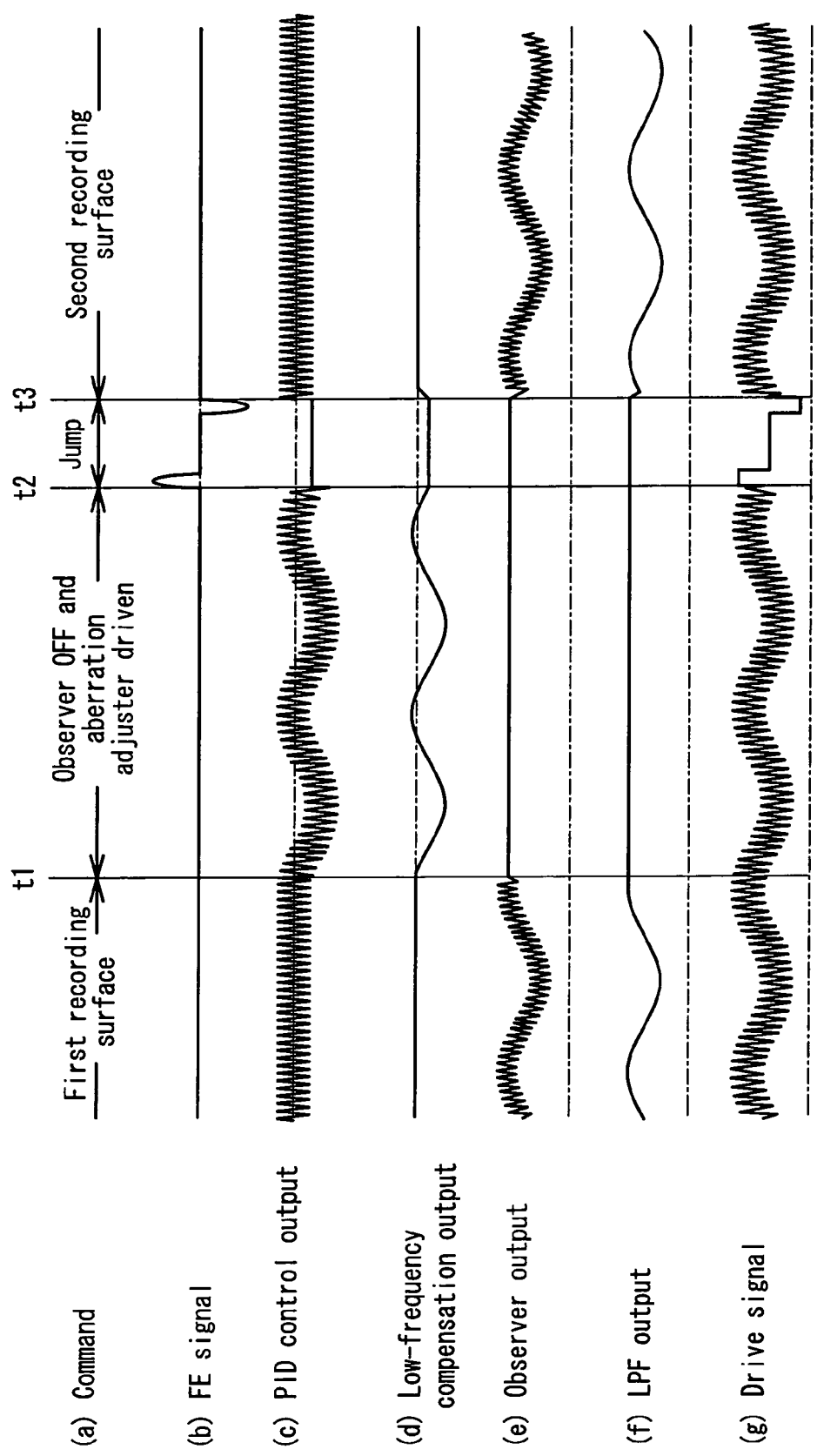
FIG. 2 is a waveform diagram describing the operation of that optical disk apparatus in a case where the focal position is moved between a plurality of recording surfaces.
Figure 3:
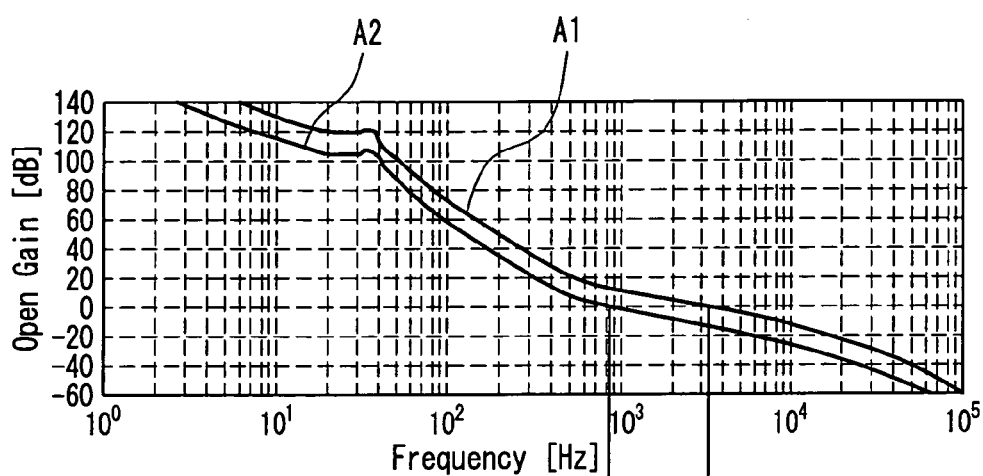
FIG. 3 is an open loop control characteristic diagram showing the focus control characteristics of that optical disk apparatus in a case where the aberration adjuster 5 is driven without turning off the disturbance estimation observer 11.
Figure 3:
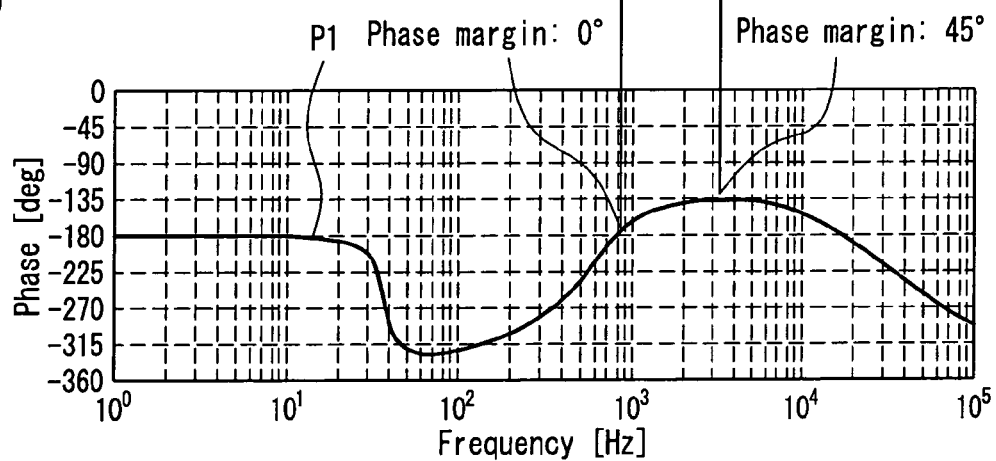
Figure 4:
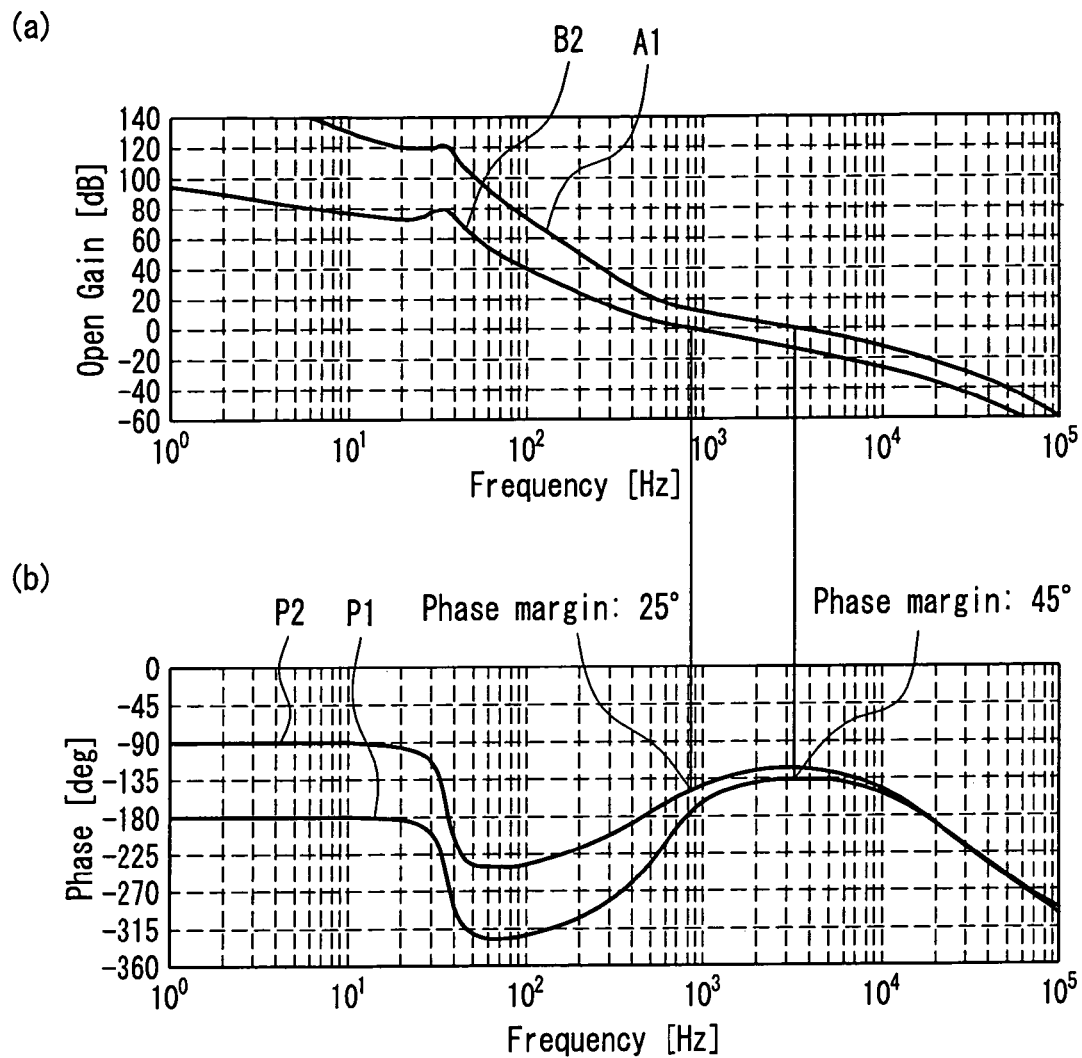
FIG. 4 is an open loop control characteristic diagram showing the focus control characteristics of that optical disk apparatus in a case where the aberration adjuster 5 is driven after first turning off the disturbance estimation observer 11.

The operation of the optical disk apparatus having this configuration is described using FIGS. 2 to 4. FIG. 2 is a waveform diagram describing the operation in a case where the focal position of the objective lens 3 is moved to the second recording surface 1*b* from the first recording surface 1*a*.

(a) shows the command that is output from the system controller 7. This diagram shows that up to the temporal point t1, the focal position of the objective lens 3 is on the first recording surface 1*a*, and from t3 onward it is on the second recording surface 1*b*. The period from t1 to t2 is a preparatory period, and the period from t2 to t3 is the jump period. An waveform (b) is the focus error signal, (c) is the PID control output from the PID control circuit 9, (d) is the low-frequency compensation output, (e) is the output of the disturbance estimation observer 11, (f) is the output of the LPF 12, and (g) is the drive signal that is output from the drive circuit 16.

When the focal position of the objective lens 3 is on the first recording surface 1*a* and the data of the first recording surface 1*a* are being read out, the disturbance estimation observer 11 is performing disturbance estimation from the input signal and the output signal of the PID control circuit 9. The LPF 12 attenuates the high-frequency component of that estimated disturbance and extracts the DC component of the disturbance. Here, the output of the disturbance estimation observer 11 is supplied to the summing circuit 10. When in this state the system controller 7 at the temporal point t1 outputs a command for moving the focal position from the first recording surface 1a to the second recording surface 1b, the disturbance estimation observer 11 is turned off (e) and the output of the first switching circuit 13 is switched from the output of the disturbance estimation observer 11 to the output of the LPF 12 (f). Then, the aberration adjuster drive circuit 6 drives the aberration adjuster 5 to perform adjustment such that spherical aberration does not occur at the second recording surface 1b, which is where the focal point is to be moved.

Subsequent to this, at t2 the second switching circuit 15 outputs the jump signal that is generated by the jump signal generation circuit 14 in place of the output of the summing circuit 10, moving the focal position onto the second recording surface 1b. With control after the jump is finished, the disturbance estimation observer 11 is turned on (e) and the output of the first switching circuit 13 is switched to the output of the disturbance estimation observer 11.

FIG. 3 is a characteristic diagram that shows the change in the focus control open loop properties in a case in which, with the focal point on the first recording surface 1a, the aberration adjuster 5 is driven to perform adjustment such that spherical aberration does not occur on the second recording surface 1b without stopping the disturbance estimation observer 11. A diagram (a) in FIG. 3 shows the gain characteristic, and a diagram (b) in FIG. 3 shows the phase characteristic. A line A1 in (a) shows the gain characteristic in a state where the focal point of the objective lens 3 and the aberration adjuster 5 have been adjusted to the first recording surface 1a. A line A2 shows the gain characteristic in a state where the focal point of the objective lens 3 has been adjusted to the first recording surface 1a and the aberration adjuster 5 has been adjusted to the second recording surface 1b. From these characteristic diagrams it can be understood that due to considerable decrease of the detected gain of the focus error that is output by the focus error detection circuit 8 by a magnitude of about 1/5, the phase margin of the focus control changes from 45° to 0° and focus control no longer is possible.

On the other hand, FIG. 4 is a characteristic diagram that shows the change in the focus control open loop properties in a case where the aberration adjuster 5 is driven to perform adjustment to keep spherical aberration from occurring on the second recording surface 1b after stopping the disturbance estimation observer 11 with the focal point on the first recording surface 1a. The line A1 in FIG. 4 is the same as the line A1 in FIG. 3. However, the line B2 shows the gain characteristic when the disturbance estimation observer 11 is stopped in a state where the focal point of the objective lens 3 is on the first recording surface 1a and the aberration adjuster 5 is adjusted to the second recording surface 1b. Also, the line P1 in FIG. 4 shows the same phase characteristic as the line P1 shown in FIG. 3, and the line P2 shows the phase characteristic corresponding to (a) of FIG. 4. From these characteristic diagrams it can be understood that even if there is a considerable drop of a magnitude of about 1/5 in the detected gain of the focus error that is output by the focus error detection circuit 8, by stopping the disturbance estimation observer 11 it is possible to suppress the drop in the phase margin of the focus control from 45° to 25°, allowing the stability of the focus control to be ensured.

According to the above embodiment, in the steady control state the output of the disturbance estimation observer 11 is passed through the LPF 12 to attenuate its high-frequency components, and the disturbance estimation observer 11 is turned off before jumping the focal position to the other recording surface and in place of its output the final value held by the LFP 12 is used. Then, the aberration adjuster 5 is set to the recording surface to which the jump is to be made. This avoids the problem of the phase margin of the focus control being lost during a series of jumping operations, resulting in out of control, allowing a stable jumping operation always to be performed.

It should be noted that with this configuration, disturbance estimation by the disturbance estimation observer 11 is performed using the input and the output of the PID control circuit 9, and this makes it possible to combine those two elements into a single filter and also allow the LPF 12 to be provided in a single unit with this filter, allowing a high control stability to be achieved with an extremely simple configuration. Further, by realizing the filter with software, the need for additional hardware is eliminated completely, and the LPF 12 does not require a high speed processing, so that there is caused only a very minor effect on the PID control circuit 9, making the configuration simple.

The observer in the above configuration is used for disturbance estimation, although the concept of the present embodiment also can be adopted in a case where the observer is used for velocity estimation, for example, and is not limited to the above configuration. Further, the configuration of the present embodiment still can be employed to obtain these effects even if the PID control circuit 9 does not necessarily include all of a low-frequency compensation circuit, a proportional computation circuit, and a phase compensation circuit. That is, the configuration of the present embodiment is effective as long as it includes a phase compensation circuit.

Additionally, in the above configuration, the cutoff frequency of the LPF 12 is set to several times the disk rotational frequency, but depending on the specifications of the drive or the disk, it may be more stable to set it to lower than the disk rotational frequency or to raise it closer to the control band of the disturbance estimation observer, and is not limited to the description of the present embodiment. At the very least, setting the cutoff frequency of the LPF 12 below the control band of the disturbance estimation observer allows a sufficient practical effect to be achieved.

Second Embodiment

Figure 5:
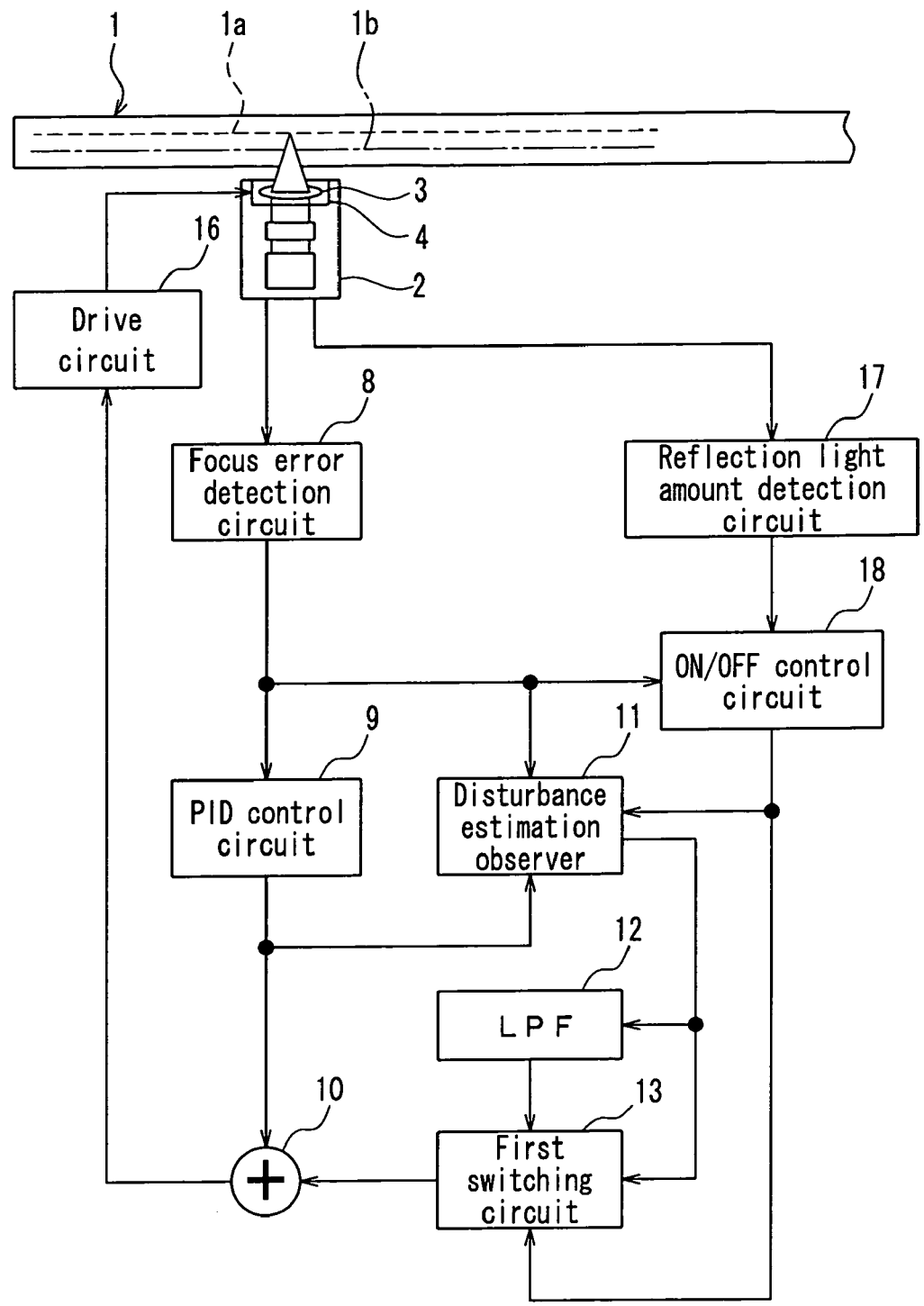
FIG. 5 is a block diagram showing a schematic configuration of the main elements of the optical disk apparatus according to the second embodiment of the invention.

FIG. 5 is a block diagram showing the configuration of an optical disk apparatus according to a second embodiment. In FIG. 5, the structural elements that are identical to those of the example detailed in the first embodiment are assigned the same reference numerals and the description thereof will not be repeated. This optical disk apparatus differs from that of the first embodiment in that it is provided with a reflection light amount detection circuit 17 and an ON/OFF control circuit 18. The reflection light amount detection circuit 17 outputs a signal that is proportional to the amount of light that has been reflected from the optical disk 1 and detected by the optical head 2. The ON/OFF control circuit 18 monitors the level of the reflection light amount signal that is output by the reflection light amount detection circuit 17, and when the value of that signal falls below a reference level at which condition can be determined to be out of control, it outputs a signal that turns off the disturbance estimation observer 11. The reference level also can be set suitably based on the lower limit value of the reflection light amount that can be processed in a normal control operation.

That is, the ON/OFF control circuit 18 has the function of performing a state determination of detecting the control state of the position of the optical head 2 at that time based on the output of the optical head 2. The ON/OFF control circuit 18 also can have a configuration with which the control state of the position of the optical head 2 is determined by referring to the focus error signal that is output by the focus error detection circuit 8.

Figure 6:
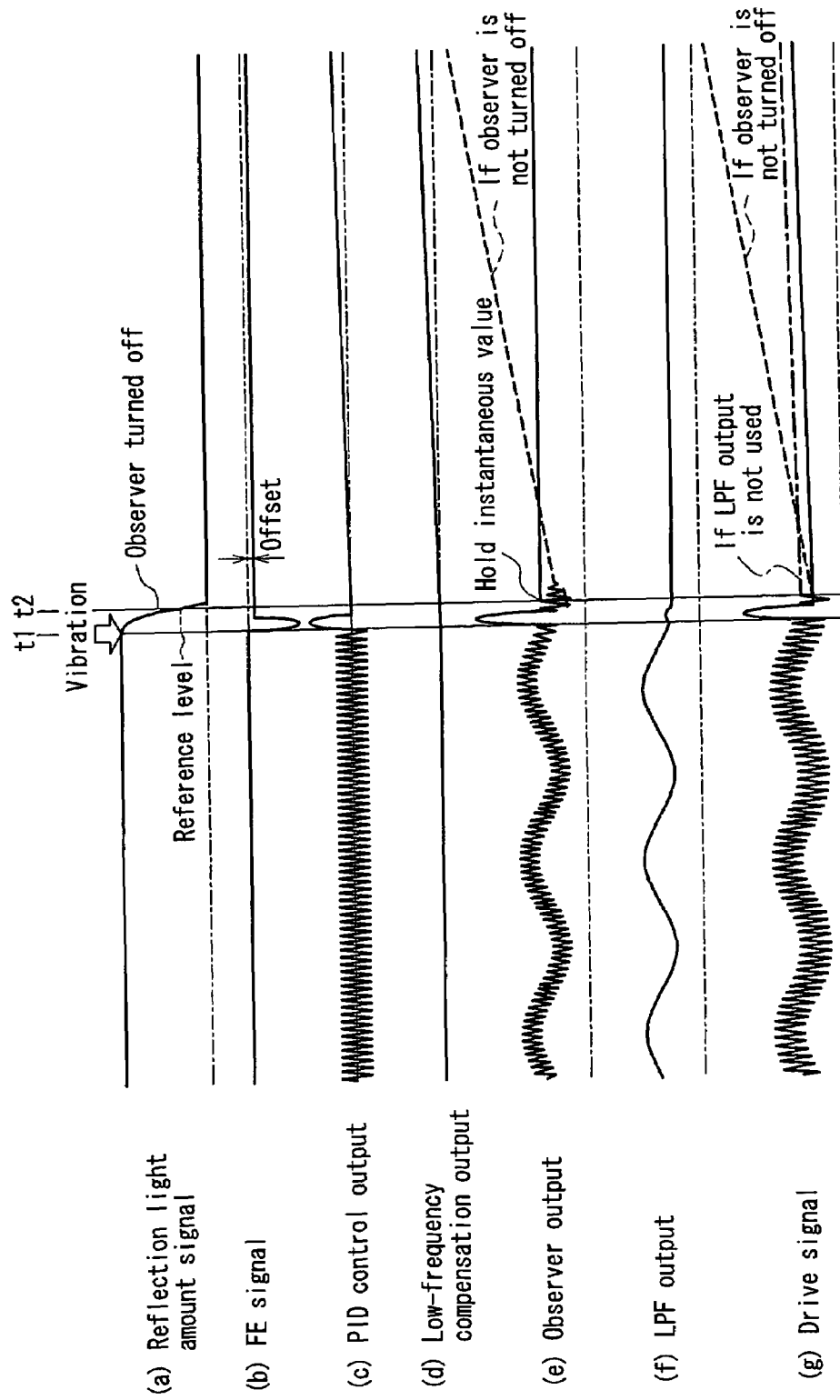
FIG. 6 is a waveform diagram describing the operation of that optical disk apparatus in a case where an external vibration has been added.

The operation of the optical disk apparatus having the above configuration is described using FIG. 6. FIG. 6 is a waveform diagram describing the operation in a case where an outside vibration that has been added to the optical disk apparatus has caused the control to become unstable. (a) shows the reflection light amount signal that is output by the reflection light amount detection circuit 17, and the other waveform diagrams are the same as those of FIG. 2.

In FIG. 6, the period up to the temporal point t1 shows a state in which the focus control is operating stably. Then, when at t1 a strong vibration is added from the outside, the FE signal (b) has a large fluctuation, resulting in out of the focus control. When the focus control is out, the FE signal (b) that is output by the focus error detection circuit 8 becomes a center value and the reflection light amount signal (a) that is output by the reflection light amount detection circuit 17 is attenuated. However, in an actual circuit the FE signal will have some degree of offset and never completely becomes zero. For that reason, as the disturbance estimation observer 11 continues operation, its output continues to rise as shown by the dashed line in (e), and therefore the drive signal shown in (g) also continues to rise as shown by the dashed line. If this is allowed to continue, the objective lens 3 will draw close to the optical disk 1, and in a worst-case scenario, the objective lens 3 will crash into the optical disk 1.

However, in the present embodiment, when the level of the reflection light amount signal drops below the reference level due to attenuation, the ON/OFF control circuit 18 outputs an OFF signal to the disturbance estimation observer 11 to stop the disturbance estimation process. By doing this, the output of the disturbance estimation observer 11 no longer continues to rise, but when off, there are cases in which the output of the disturbance estimation observer 11 fluctuates over a large amplitude range. Even in such cases, as shown in FIG. 6, by the first switching circuit 13 switching from the output of the disturbance estimation observer 11 to the output of the LPF 12, whose high-frequency component has been attenuated, and supplying this to the summing circuit 10, there are no significant fluctuations in the drive signal as shown by the long-short dashed line in (g), limiting the fluctuation to only that of the output of the PID control circuit 9 as shown by the solid line. Consequently, the problem of the objective lens 3 approaching and crashing into the optical disk 1 is avoided.

As described above, according to the present embodiment, if the output of the reflection light amount detection circuit 17 falls below a reference level, then the estimation operation of the disturbance estimation observer 11 is stopped and the output of the LPF 12 is supplied in place of the output of the disturbance estimation observer 11, so that even if the focus control is out due to vibration from an external source, for example, a negative effect due to instability in the drive signal can be avoided.

It should be noted that with this configuration, disturbance estimation by the disturbance estimation observer 11 is performed using the input and the output of the PID control circuit 9, and thus it is possible to combine those two elements into a single filter and also allow the LPF 12 to be provided in a single unit with this filter, allowing high control stability to be achieved with an extremely simple configuration. Further, by realizing the filter with software, the need for additional hardware is eliminated completely, and the LPF 12 does not require a high speed processing, so that there is caused only a very minor effect on the PID control circuit 9, making the configuration simple.

The observer in the above configuration is used for disturbance estimation, although the concept of the present embodiment also can be adopted in a case where the observer is used for velocity estimation, for example, and this is no limitation to the above configuration.

Further, the above embodiments were described with regard to the case of focus control, but the concept of the present invention similarly can be adopted for tracking control and there is no limitation to the description of the above embodiments.

In the above embodiments, the ON/OFF control circuit 18 performed state determination by detecting the state of the control of the position of the optical head 2 at that time based on the output of the reflection light amount detection circuit 17, but it is also possible to adopt a configuration in which the state of the control of the position of the optical head 2 is determined in reference to the focus error signal that is output by the focus error detection circuit 8. At this time, the reference level can be established suitably based on the upper limit value and the lower limit value of the focus error signal that is detected in the normal control operation. Also, as shown in FIG. 5, the ON/OFF control circuit 18 also can determine the control state of the position of the optical head 2 by referencing both the output of the reflection light amount detection circuit 17 and the focus error signal that is output by the focus error detection circuit 8.

In the above embodiments, as shown in FIGS. 1 and 5, the PID control circuit 9, the disturbance estimation observer 11, the LPF 12, the first switching circuit 13, the second switching circuit 15, the jump signal generation circuit 14, the ON/OFF control circuit 18 and so on are configured as electronic circuits. However, whole of those circuits can be configured as software using a processor such as DSP, and the configuration is not limited to above-mentioned embodiments.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk apparatus comprising:
    an optical head that focuses a light beam to form a beam spot on a recording surface of an optical disk, and detects light that is reflected therefrom;
    an aberration adjuster provided in the optical head;
    an aberration adjuster drive portion that drives the aberration adjuster;
    a movement portion that moves the beam spot in a direction that is perpendicular to the recording surface or in a radial direction of the optical disk;
    a position control portion that controls a position of the movement portion based on an output signal of the optical head such that the beam spot is in a predetermined state with respect to the recording surface;
    an observer processing portion that estimates a state relating to the movement portion; and
    a summing portion that takes a sum of an output of the position control portion and an output of the observer processing portion;
    the optical disk apparatus driving the movement portion based on an output of the summing portion;
    wherein the optical disk apparatus further comprises:
    an ON/OFF control portion that controls whether the observer processing portion is on or off;
    a low-pass filter that attenuates high-frequency components of the output of the observer processing portion and holds a final value of the observer processing portion when the observer processing portion is turned off;

a switching portion that switches its output between the output of the observer processing portion and an output of the low-pass filter according to whether the observer processing portion is on or off; and a state management portion that manages a transition to a state m which a loop gain of the position control by the position control portion fluctuates, the fluctuation of the loop gain being caused when the aberration adjuster is driven by the aberration adjuster drive portion so that spherical aberration does not occur;

wherein the ON/OFF control portion controls whether the observer processing portion is on or off based on an output of the state management portion;

wherein the state management portion sets the observer processing portion to off prior to transition to the state in which the loop gain of the position control fluctuates, and sets the observer processing portion to on after transition to a state in which the loop gain is stable; and wherein when the observer processing portion is in the on state, its output is supplied to the summing portion, and when the observer processing portion is in the off state, the output of the low-pass filter is supplied to the summing portion.

2. The optical disk apparatus according to claim 1, wherein a cutoff frequency of the low-pass filter is set below a control band of the observer processing portion.

3. The optical disk apparatus according to any claim 1, wherein the position control portion is provided with a position error detection portion that detects an amount of deviation of the optical head from an ideal position, and a PID filter processing portion that subjects an output of the position error detection portion to at least phase compensation; and wherein the observer processing portion is configured such that it estimates a disturbance, for example, from an input and an output of the PID filter processing portion.

* * * * *